July 21, 1931.  L. MIR  1,815,478
SWAB MAKING MACHINE
Filed Feb 24, 1928   5 Sheets-Sheet 5

Inventor
Lewis Mir
By his Attorney,
George D. Richards

Patented July 21, 1931

1,815,478

UNITED STATES PATENT OFFICE

LEWIS MIR, OF JERSEY CITY, NEW JERSEY

SWAB MAKING MACHINE

Application filed February 24, 1928. Serial No. 256,662.

This invention relates to an automatic machine for forming dauber or swab devices and assembling the same with a wire handle shank for connection with bottle corks or stoppers or for separate use.

The invention has for its principal object to provide an automatic machine which is adapted to feed a fibrous material of which a dauber or swab head is composed, to feed wire and cut the same into handle shanks of suitable length, and then connect or attach said shanks to the dauber or swab head material, after which the assembled shanks and material are cut apart to furnish the desired complete individual dauber or swab devices.

The invention has for a further object to provide a novel arrangement and organization of mechanism whereby the several steps involved in manipulating the materials, assembling the same together, and delivering the completed dauber or swab devices, are coordinated and relatively timed to automatically carry out the same in a rapid and efficient manner, to the end that the devices may be automatically produced with a minimum expenditure of time, labor and cost.

Other objects of this invention, not at this time more particularly enumerated, will be clearly understood from the following detailed description of the same.

The invention is clearly illustrated in the accompanying drawings, in which:—

Similar characters of reference are employed in all of the hereinabove described views, to indicate corresponding parts.

Referring to said drawings, the reference character 15 indicates a base or bed-plate suitably supported on legs or standards 16. Fixed on said base or bed-plate are aligned pedestal bearings 17, 18 and 19, in which is journaled a main shaft 20 provided with a suitable drive pulley 21, which may be driven from any suitable source of power. Cooperating with said drive pulley and main shaft is any suitable form of clutch-mechanism 22 having an actuating lever means 23, whereby the pulley may be thrown into and out of driving relation to the shaft at will.

Mounted loosely on said main shaft 20, toward the forward end of the same, so as to rotate thereon is a conveyer or carrier wheel 24, having on its periphery laterally spaced rows of radial projections or teeth 25 to provide intermediate carrier pockets 26. Back of said carrier wheel 24 is a housing 27 which straddles said main shaft 20, and which is arranged to provide a vertical slideway 28 for purposes to be subsequently set forth. Affixed to the top or upper end of said housing 27 is a bracket 29 having at its free end a vertically disposed bearing plate 30. Adjacent to said housing 27 is a vertical frame 31 providing a slideway 32 in which is arranged a reciprocatory cross-head 33 to which is affixed a vertical toothed rack 34. The means for reciprocating said rack 34 comprises a shaft 35 mounted in a bearing 36 adjacent to said main shaft 20. Said shaft 35 is driven from said main shaft 20 by intermeshing gears 37 and 38 respectively fixed on said shaft 20 and said shaft 35. Connected with and rotated by said shaft 35 is a crank-arm 39, the free end of which is operatively connected with said cross-head 33 by a link 40.

Suitably mounted adjacent to the left hand end of said base or bed-plate is a bracket plate 41 which is disposed in transverse vertical plane above said base or bed plate so as to extend outwardly beyond the front edge of the latter. Fixedly secured adjacent to the inner end of said plate 41 is a sleeve 42 having an axial opening 43 through which the supply 44 of fibrous material of which the dauber heads are made is fed. Said sleeve 42 is provided at its inner end with an annular head 45 having an oblique face 46 and a transverse guide notch 47 entering through one side thereof. Rotatably mounted on said sleeve 42, back of said head 45, is a rotary member 48 having attached to its face a bending stud 49 provided with an annularly grooved anti-friction roller 50. Said rotary member 48 is secured to and rotated by a gear 51. The means for producing timed rotary oscillations of said member 48 and its bending stud 49, comprises a transmission shaft 52 which is journaled in and between the lower end of said bearing plate 30 and a bearing means 53 connected with the side of said housing 27. Fixed on said shaft 52 is a pinion 54 with which said rack meshes. Journaled in and between the upper end of said bearing plate 30 and said bracket plate 41 is a jack shaft 55, the same being driven from said transmission shaft 52 by intermeshing gears 56 and 57 respectively fixed on said shafts 52 and 55. Fixed on said jack shaft 55 is a gear 58 which drives said gear 51 of the member 48, through an intermediate idler gear 59.

Mounted on the outer part of said bracket plate 41 is a wire feeding mechanism which supplies the wire from which the handle shanks of the dauber devices are made. This wire feeding mechanism comprises a track plate 60 upon which is slidably mounted a wire feeding carriage 61 for reciprocation thereon. Said carriage 61 is provided at its face with a longitudinally extending forwardly off-set stationary jaw-member 62 over and upon which the wire W to be fed is led. Above and cooperating with said stationary jaw-member 62 is a yieldable spring-pressed jaw-member 63. A flat spring 63' is illustrated as yieldably pressing the jaw-member 63 towards the stationary jaw-member 62. The means for both producing the gripping and releasing action of said jaw-members while at the same time reciprocating the feeding carriage to intermittently feed forward the wire for application to the dauber head material, (see Figure 3) comprises a driven shaft 64 extending at right angles to said main shaft 20, and driven from the latter by the intermeshing bevel gears 65 and 66. Operated by said driven shaft 64 is a crank 67, and suitably pivoted to the frame of the machine is an oscillatable lever 68 interconnected with and actuated by said crank through a link 69. Pivoted to said feeding carriage by a stud 70 with which the latter is furnished is a rocker plate 71 provided with an eccentric 72 rotatable on movement of said rocker plate 71 about the axis of said stud 70. Engaged on said eccentric 72 is a presser-piece 73 adapted, on forward movement of the carriage, to urge the yieldable jaw-member 63 into gripping relation to the wire W. Said rocker-plate 71 is operatively interconnected with and actuated by said oscillatable lever 68 through a link 74 pivotally connected at one end to the rocker-plate and at its other end to the lever 68. As will be further described, forward swinging movement of the oscillatable lever 68 causes link 74 to initially turn rocker plate 71 counter-clockwise about the stud 70 as viewed in Fig. 3. As rocker plate 71 so turns, the eccentric 72 operates to move pressure-piece 73 downwardly compressing spring 63' and urging jaw-member 63 into gripping engagement with wire W. Further turning movement of rocker plate 71 is thus resisted, causing carriage 61 to move along with link 74 and lever 68, thereby feeding wire W as desired. Upon the return movement of oscillatable lever 68, link 74 operates initially to turn rocker plate 71 and eccentric 72 in a clockwise direction to release the pressure on spring 63', thereby causing jaw-member 63 to release its grip on wire W. During this movement of the rocker plate 71 a stop pin 71' carried thereby moves into abutting relation with the side of link 74 so as to prevent further rotation of the rocker plate and causing carriage 61 to move into retracted position along with lever 68.

Figures 3, 7, 8, 9, 12:
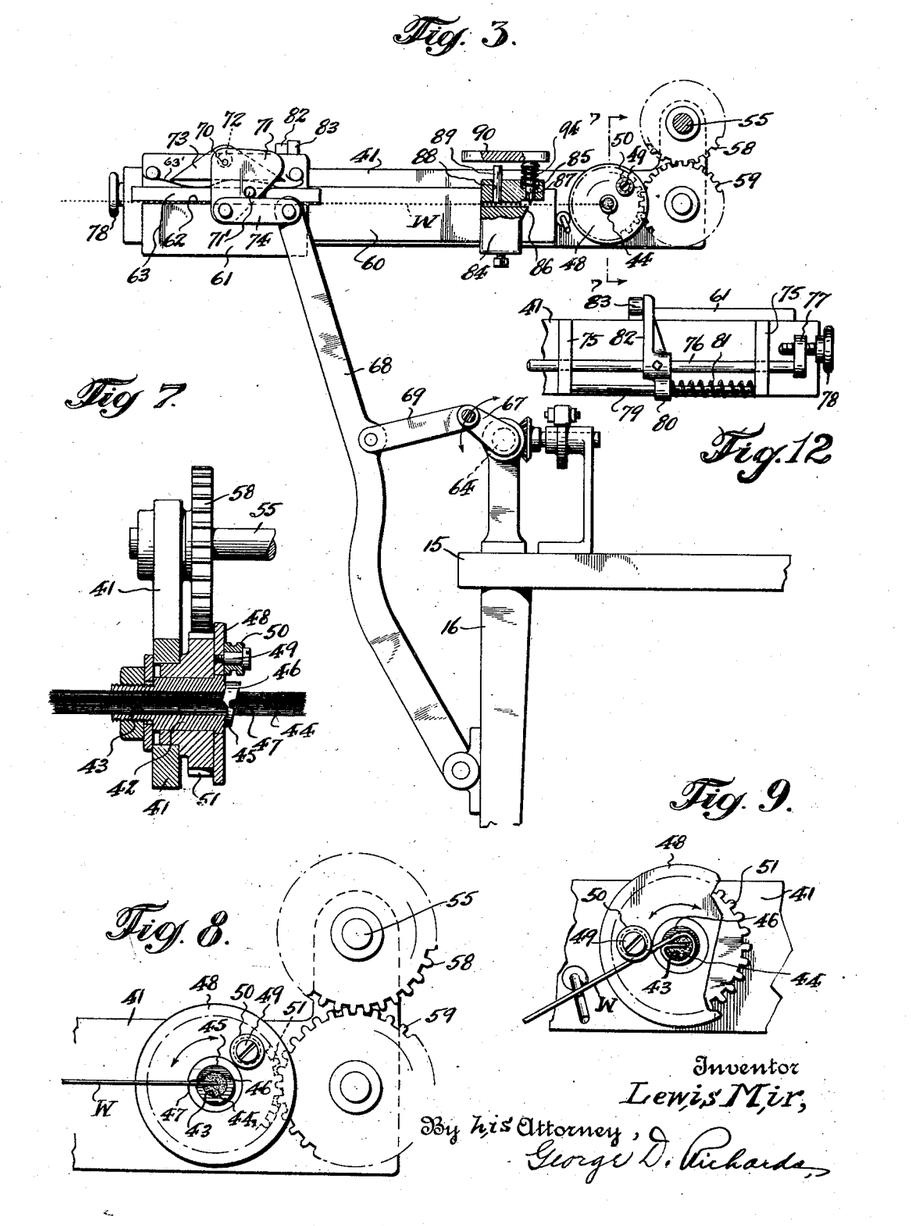
Figure 3 is a fragmentary sectional view, taken on line 3—3 in Figure 1.
Figure 7 is an enlarged detail sectional view of the shank assembling dies, taken on line 7—7 in Figure 3.
Figure 8 is an enlarged face view of said shank assembling dies in an initial stage of the operation thereof.
Figure 9 is a similar view at a later stage of the operation thereof.
Figure 12 is a rear side elevation of the wire feed mechanism.

Means is provided for adjustably determining the effective wire gripping stroke of the feeding carriage so that the length of wire fed may be adjusted to vary at will the length of the handle shank portions cut therefrom. This means is best illustrated in Figure 12. Mounted on the back of said bracket plate 41, so as to be slidable in supporting extensions 75 with which said bracket plate 41 is provided, is an adjustable slide rod 76, having at its outer end a head 77 to carry an adjustable stop-screw 78 which is caused to bear against one of said supporting extensions 75. Fixed to and extending between said extensions 75 in parallel relation to said slide rod 76 is a guide rod 79, upon which is slidably mounted a push-piece 80 which may form a part of a detent member 82. A compression spring 81 arranged around said guide rod 79 bears against and tends to thrust forwardly on said push-piece. Adjustably fixed on said slide-rod 76 is the detent member 82, which at proper times is engageable with a nosing 83 with which the wire feeding carriage is furnished.

Means is provided intermediate the wire bending mechanism and the wire feeding carriage for severing the wire into lengths suitable for the formation of the handle shanks of the daubers. This means comprises an anvil block 84 adjustably fixed on the inner end portion of the track plate 60, and which is provided with a horizontal opening or way through which the free end of the wire W extends toward the bending mechanism. Connected with said anvil block 84, at the end toward the bending mechanism, is a fixed cutting jaw 86 over which the wire passes. Disposed to reciprocate in a slideway 85 is a spring lifted cutting tool 87 which cooperates with said cutting jaw 86. Said anvil block 84 is further provided with a second vertical slideway 88 in which is disposed a clamp-member 89. Said cutting tool and clamp member are actuated by a vertically reciprocable head 90 which is provided with a depending slide-piece 91 slidably mounted in a forwardly projecting supporting arm 92 with which a standard 93 is furnished. Said head 90 is biased to normally raised inactive position by the spring means 94 of the cutting tool 87. The means for actuating said head to cause the cutting tool and clamp member to function, comprises a vertically slidable plunger rod 95 which is slidably mounted in bearing portions 96 carried by said standard 93. The lower end of said plunger rod 95 is provided with an anti-friction roller 95'. Fixed on and rotated by the shaft 64 is a cam 97 upon which the roller 95' of the plunger rod 95 bears. Connected with said plunger rod is a collar 98 furnished with a laterally projecting stud 99. Said plunger-rod 95 is biased toward said cam 97 by a compression spring 100, which is arranged around said rod between the collar 98 and the upper bearing portion 96 of the standard 93. Pivoted on said standard 93 is a trip-lever 101, the rearward arm of which lies in the path of movement of said stud 99 while the forward arm of which is operatively engaged over a laterally projecting pin 102 which is secured to the lower end of said slide-piece 91 of the head 90.

Timed intermittent rotary motion or step by step movement is imparted to the conveyer or carrier wheel 24 by the following mechanism. Mounted on the bed-plate or base 15 adjacent to the left hand side of the carrier-wheel 24 (as viewed in Figure 2) is a fulcrum post 103 upon which is fulcrumed a lever member 104 upon the forward end of which is pivoted a push-pawl 105, yieldably held in operative relation to the teeth 25 of the carrier-wheel by spring means 106. Said push-pawl is biased to downwardly retracted position by a compression spring means 107 which bears upwardly against the tail or rear end of said lever member 104. Journaled in suitable bearings so as to extend over and across the tail or rear end of the lever member 104 is a shaft 108 which receives its motion from said shaft 64 through the intermeshing bevel gears 109 and 110. Fixed on and rotated by said shaft 108 is a cam 111 adapted during its rotation to engage and swing down the tail of said lever member 104 to rock the latter whereby up-thrusting movement of said push-pawl 105 is produced, so that by its engagement with the teeth 25 of said carrier-wheel 24, said pawl transmits and produces intermittent movement of the latter.

Figures 1, 13:
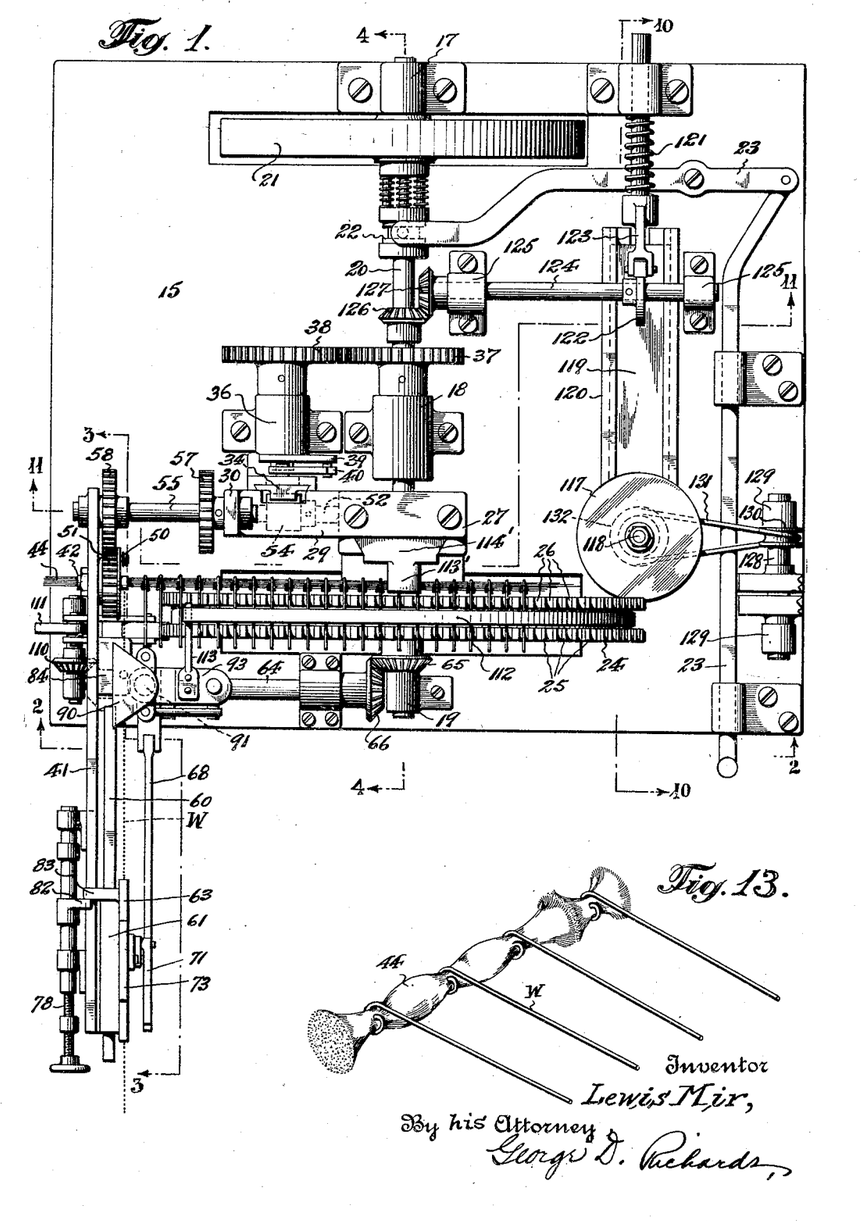
Figure 1 is a plan view of the novel machine made according to and embodying the principles of this invention.
Figure 13 is a perspective view of a series of dauber or swab devices, one of which has been severed to provide the detached completed individual device.

In the operation of the machine, as thus far described, the fibrous material 44 of which the dauber head is composed is supplied to machine in a continuous length or rope of desired thickness and with the fibrous strands running lengthwise. This material may comprise any vegetable yarn, wool or other filamentary material. The end of the length or rope of material 44 is passed through the axial opening 43 of the sleeve 42 and is then extended over the conveyer or carrier wheel 24 and adjacent one side thereof as shown in Fig. 1.

In this manner the length or rope of material 44 is opposed sidewise to the handle wire feeding mechanism, so that one end of the handle wire may be inserted crosswise through the material 44, whereupon the handle wire may be manipulated by the bending mechanism to initially couple the same in attached relation to the dauber head forming material 44. Initially in starting the machine the rope or length of dauber head material may be attached to the carrier-wheel 24 in any suitable manner as by engagement with a suitable clip mounted on the side of this wheel near the periphery thereof so that the intermittent motion of the latter may be transmitted to the former to draw the same step by step for presentation to the handle wire feeding and attaching mechanism. By properly timed operation, during the intervals of stop or stationary dwell of the carrier-wheel 24, the wire feeding and attaching mechanism is caused to function in the following manner. Upon inward swinging movement of the lever 68 the link 74 first turns the rocker-plate 71 about the axis of the stud 70 thus rotating the eccentric 72 whereby the presser-piece 73 is moved downward so as to force the jaw-member 63 to forcibly grip the wire W in cooperation with the stationary jaw-member 62. It may here be pointed out that on the back stroke of the lever 68, the rocker-plate is first turned back to initial position, thereby raising the presser piece 73 so that the jaw 63 is released relative to the jaw 62 whereby said jaws will slide over the wire W on retraction of the carriage without moving the latter. Continued inward swinging movement of the lever 68 thereupon moves forward the wire feeding carriage 61 on the track plate 60, thereby thrusting forward the free end of the wire W toward the rope or length of dauber head material. When thus moved the free end of the wire W is caused to pass through the guide notch 47 to transversely penetrate the mass of said length or rope of dauber head material, so as to be disposed ready for the wire bending operations by means of which the mutual attachment or coupling of the wire and material is effected. Before the wire bending operations are initiated, the wire severing or cutting means is caused to operate to cut off the length of wire suitable for the desired size of handle shank. To this end head 90 is caused to descend by the operation of the power transmission mechanism which actuates the same and which has already been hereinabove described. As said head 90 descends the clamp 89 grips the wire to hold the same against displacement, whereupon continued descent of the head 90 brings the cutting tool 87 into operative relation to the wire where the same is engaged by the fixed cutting jaw 86, thus severing a length thereof, suitable for the formation of the desired handle shank, from the main wire supply. The wire having been cut, the wire bending mechanism is timed to perform its functions. To accomplish this rotary movement is imparted to the member 48 whereby the bending stud 49 and its anti-friction roller 50 is moved toward and into engagement with the wire, so that as this movement is continued the wire is bent bodily around the length or rope of dauber material substantially in the manner shown in Figure 9. When the wire is so bent, the same is caused to move against the oblique face 46 of the sleeve head 45 so that a substantially spiral convolution is produced to off-set one part of the bend from the other.

While the bending operations are being performed, the wire feeding carriage is retracted to normal initial position by the outward stroke of the lever 68. As the lever 68 swings outward the link 74 first turns back the rocker-plate 71 to normal position with its stop pin 71' engaging the link, thus through reverse motion of the eccentric 72 lifting the presser-piece 73 to release the jaw-member 63, so that the latter with the stationary jaw-member 62 slides backwardly over the wire W, which is held against retractive movement by the clamp-member 89. Upon completion of the bending operation, and preferably while the carrier-wheel 24 is moved or advanced one step the reverse movement of the power transmitting rack and pinion 34—54, through the described intermediate transmission mechanism, returns the bending mechanism to initial starting position. The above described operations are intermittently repeated as the carrier-wheel 24 moves forward step by step to progressively advance new portions of the dauber head material subject to the action of the wire feeding and bending mechanism.

As the carrier-wheel 24 is advanced step by step, the shank forming wires which have been attached to the dauber head material will be delivered into the carrier pockets 26 between the teeth or projections 25 so as to be moved therewith, and so as to operate to draw the dauber head material into the machine. In order to prevent displacement of the shank forming wires from the pockets 26 I provide a keeper-strap 112 contiguous to the carrier wheel and aligned to the space intermediate the rows of teeth or projections 25, said strap being suitably supported at its respective ends by supporting posts 113 and 114 suitably attached to some stationary part of the machine.

It is found desirable to provide means to vary the length of the handle-shanks since the length of such handle-shanks will be predetermined by the depth of the bottle or container with which a given dauber is to be used. In the machine of this invention I have provided means in connection with the wire feeding carriage (the structure of which has been already hereinabove described) whereby the effective feeding stroke of said carriage may be varied to in turn vary the length of wire, while also the anvil block 84 may be adjusted toward or away from the bending mechanism to correspond to the length of wire to be fed. The effective stroke of the wire feeding carriage is governed by adjusting the slide-rod 76 to advance or retract the detent member 82. If a shorter handle shank wire is desired said detent member 82 is moved inward (i. e., toward the bending mechanism) and conversely if a longer shank wire is desired said detent member is moved oppositely or outwardly. As the wire feeding carriage is retracted its nosing 83 engages the detent 82 and presses back the same against the slide-rod 76 against the tension of the spring 81 until the rearward stroke of the lever 68 is completed to carry the carriage to its backward limit of movement. Now when the lever 68 swings inward its link 74 will not be able to turn the rocker-plate 71 for the reason that the spring 81 will thrust forward the detent 82 which in turn will thrust on the nosing 83 thus causing the carriage to follow the lever movement until such time as the detent 82 comes to rest and no longer presses on the nosing 83, whereupon the pull of the link 74 becomes effective to turn the rocker-plate 71 to cause the wire gripping jaws 62—63 to grip the wire W. It will thus be apparent that the point in the forward or operative stroke of the wire feeding carriage at which it is desired to effect the wire gripping action may be altered to feed greater or less length of wire within maximum and minimum limits as may be desired.

Figures 4, 5, 6:
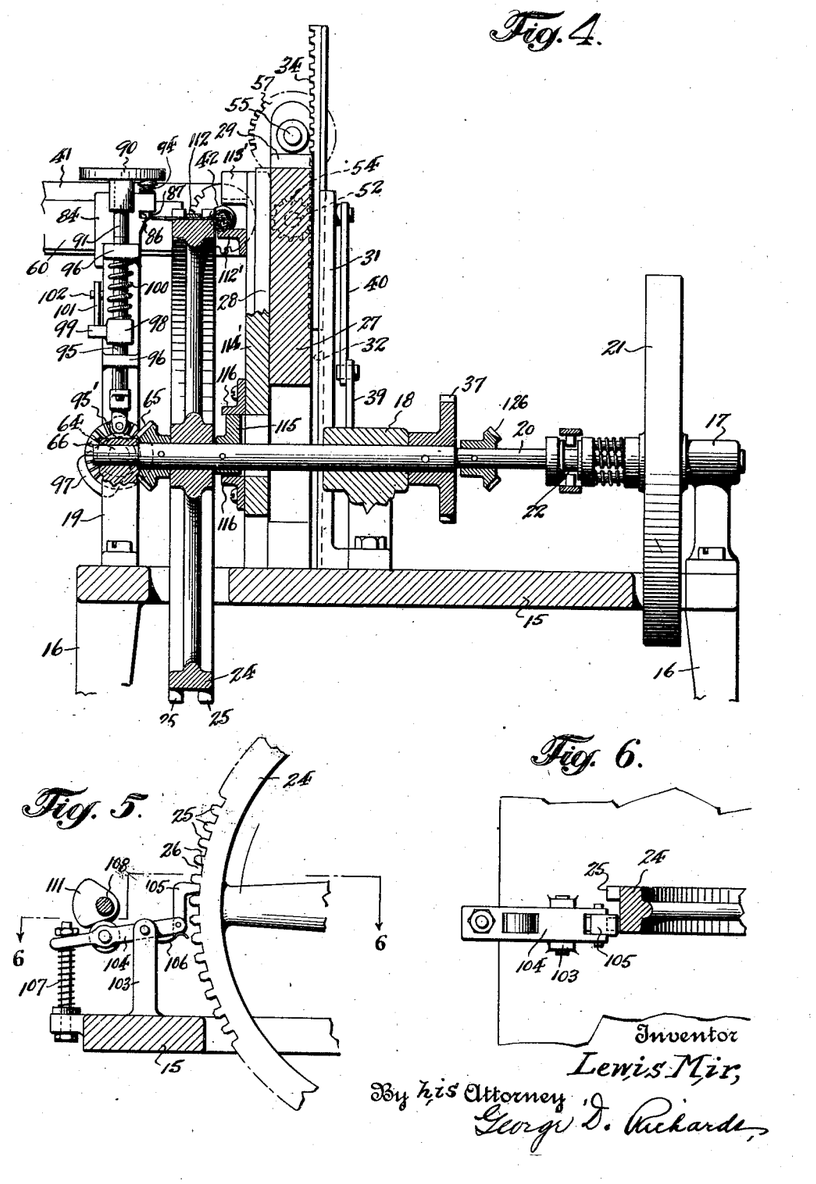
Figure 4 is a fragmentary sectional view taken on line 4—4 in Figure 1.
Figure 5 is a detail view of the conveyer or carrier wheel of the machine, showing the method of actuating the same.
Figure 6 is a detail horizontal section, taken on line 6—6 in Figure 5.
Figure 10:
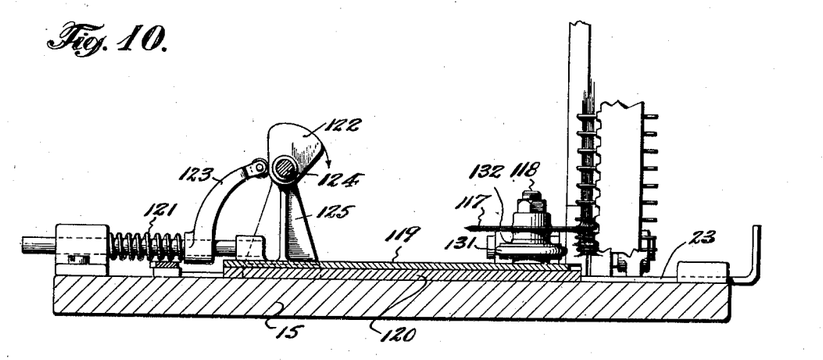
Figure 10 is a fragmentary sectional view, taken on line 10—10 in said Figure 1.
Figure 11:
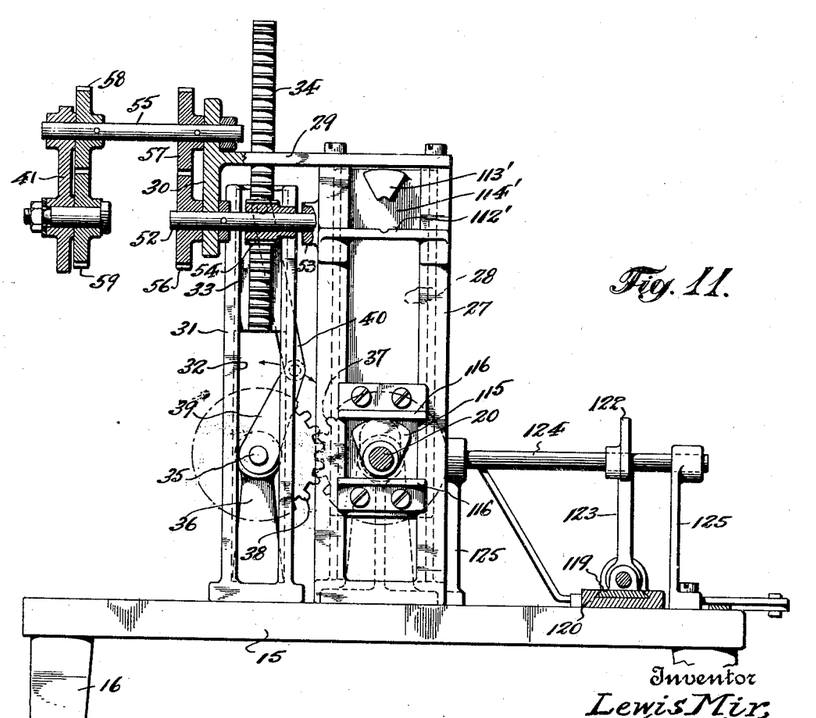
Figure 11 is a sectional view, taken on line 11—11 in said Figure 1.

As the initially assembled handle shank wires and dauber material are moved onward by the carrier wheel 24, means are provided adjacent to the latter for tightly compressing the wire convolutions about the dauber material. This means comprises a suitably fixed abutment 112' over which the dauber material and convolute portions of the wires are disposed in the path of a vertically reciprocable presser-jaw or stamp 113'. Said presser-jaw 113' is attached to a slide-plate 114' slidable in the slideway 28 of the housing 27. Said slide-plate 114' is reciprocated in properly timed relation to the successive engagement of the work progressively shifted by the movements of the carrier-wheel over the abutment 112'. The means for so actuating the slide-plate 114' comprises a cam member 115' which is fixed on and rotated by the main shaft 20; said cam cooperating with abutment flanges 116 with which the slide-plate 114' is provided, as shown more especially in Figures 4 and 11. On the down stroke of the slide-plate 114' the presser-jaw or stamp 113' descends upon the wire convolutions and pinches the same against the abutment 112', thus tightly constricting the same about the dauber material.

Figure 2:
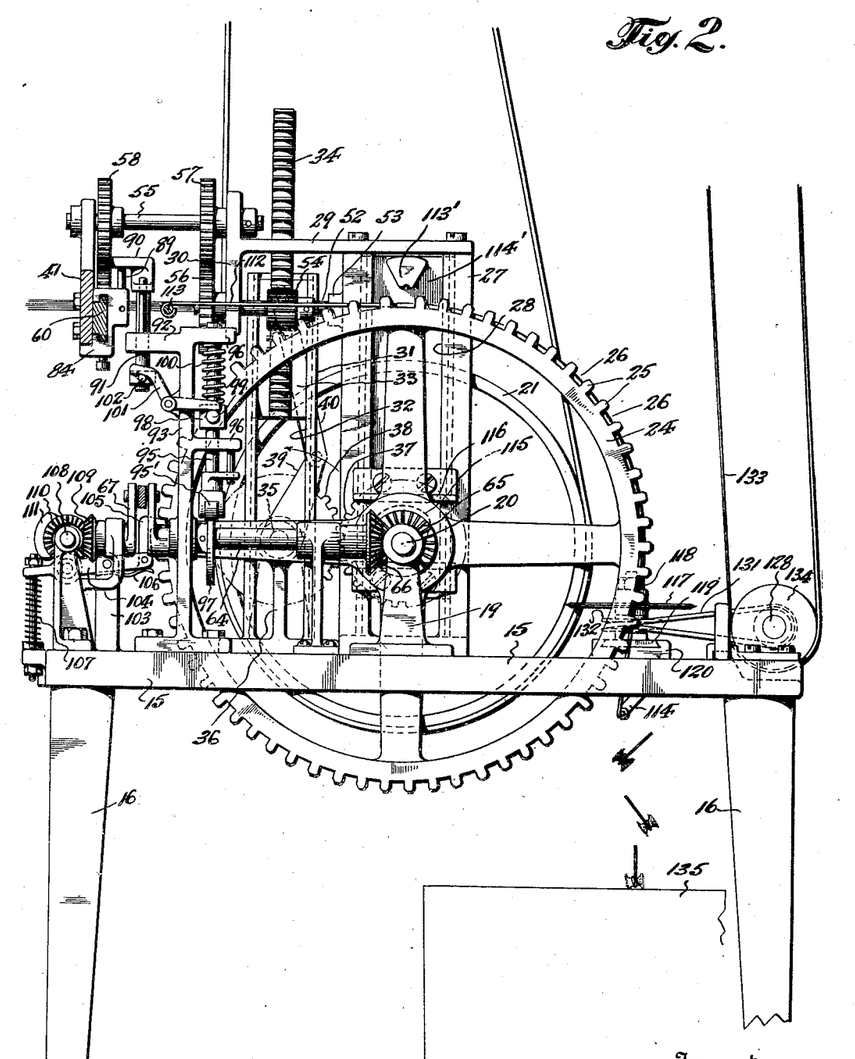
Figure 2 is a front elevation and part sectional view of the same, taken on line 2—2 in Figure 1.

It will be observed from an inspection of the drawings, that the dauber material 44 remains in a continuous length during the application of the handle shank wires thereto, the latter being attached to the dauber material in spaced apart relation. By cutting through the dauber material at points between the handle shank wires, the dauber heads are completed and at the same time reduced to separate individual members ready to be discharged from the machine. The means for thus cutting the dauber material comprises a rotary cutting blade or knife 117 which is disposed adjacent to the outer or right hand side of the carrier wheel 24. This knife 117 is mounted on a spindle 118 carried on a movable carriage 119. The carriage is mounted in a guide means 120 to reciprocate toward and away from the carrier wheel 24, so that as the latter dwells at intervals in its intermittent movement, the knife may be moved forward into operative cutting engagement with the dauber material. The means for producing the properly timed reciprocatory movement of the knife carriage comprises a compression spring 121 operative to thrust the carriage and knife into operative relation to the dauber material, and a rotating cam 112 for retracting the carriage and knife against the compression of said spring, said cam 122 cooperating with an abutment or thrust arm 123 connected with the carriage. Said cam 122 is mounted on a shaft 124 journaled in bearings 125, and said shaft is driven from said main shaft 20 by intermeshing gears 126 and 127, as shown in Figure 1. It is preferable to drive the rotating knife 117 at high speed, and one method of driving the same is illustrated in Figure 2 wherein an independently driven shaft 128 is mounted in bearings 129, said shaft having a drive pulley 130 which actuates through a drive belt 131 the knife pulley 132 which is connected with the knife as mounted on its spindle 118. Said shaft 128 may be driven from a suitable source of power by a belt 133 and pulley 134, or in any other convenient or suitable manner.

After the dauber material is cut by the knife each completed and severed dauber device will free itself from the carrier wheel 24 and may drop into a receptacle 135 adapted to receive the completed products, as shown more especially in Figure 2.

From the above description it will be apparent that a relatively simple automatic dauber making machine is provided by the instant invention, in which the various operations are properly coordinated and timed, so that once the machine is put in operation all that is necessary to do is to provide a continuous supply of wire and dauber material.

I am aware that many changes could be made in the general arrangements and combinations of the various devices and parts, as well as in the details of the construction of the same, without departing from the scope of my invention as set forth in the foregoing specification, and as defined in the claims appended hereto. Hence, I do not limit my invention to the exact arrangements and combinations of the various devices and parts, nor do I confine myself to the exact details of the construction of said parts as illustrated in the accompanying drawings.

I claim:—

1. In a dauber making machine having means to apply handle shank wire to filamentary material, means to automatically feed wire from a continuous supply and cut the same into handle shank-forming portions for attachment to said filamentary material, comprising a guide track, a wire feeding carriage having a gripping means reciprocable on said guide track, and timed means to sever shank-forming portions from said wire operative on completion of the feeding stroke of said carriage.

2. In a dauber making machine having means to apply handle shank wire to filamentary material, means to automatically feed wire from a continuous supply and cut the same into handle shank-forming portions for attachment to said filamentary material, comprising a guide track, a wire feeding carriage having a gripping means reciprocable on said guide track, timed means to sever shank-forming portions from said wire operative on completion of the feeding stroke of said carriage, and means to vary the effective operation of the gripping means of said carriage to thereby vary the length of wire fed during and by the feeding stroke of said carriage according to the length of handle shank-forming portions desired.

3. In a dauber making machine having means to apply handle shank wire to filamentary material, means to automatically feed wire from a continuous supply and cut the same into handle shank-forming portions for attachment to said filamentary material, comprising a guide track, a wire feeding carriage having a gripping means reciprocable on said guide track, timed means to sever shank-forming portions from said wire operative on completion of the feeding stroke of said carriage, and means to vary the effective operation of the gripping means of said carriage to thereby vary the length of wire fed during and by the feeding stroke of said carriage according to the length of handle shank-forming portions desired, said latter means comprising a spring thrust slide rod having a detent arm, adjustable stop means to vary the spring thrust stroke of said slide-rod, and means engageable by said detent to produce a coincidental movement of said slide rod and carriage whereby said wire gripping means is held inactive during a desired portion of the feeding stroke of the latter.

4. In a dauber making machine having means to apply handle shank wire to filamentary material, means to automatically feed wire from a continuous supply and cut the same into handle shank-forming portions for attachment to said filamentary material, comprising a guide track, a carriage reciprocable on said guide track, a fixed wire gripping jaw on said carriage, a movable wire gripping jaw, a rocker-plate for applying wire gripping pressure to said movable jaw, an eccentric for actuating said rocker-plate, a lever and link mechanism for rotating said eccentric and at the same time producing a forward wire feeding stroke of said carriage, and timed means to sever shank-forming portions from said wire operative on completion of the feeding stroke of said carriage.

5. In a dauber making machine having means to apply handle shank wire to filamentary material, means to automatically feed wire from a continuous supply and cut the same into handle shank-forming portions for attachment to said filamentary material, comprising a guide track, a carriage reciprocable on said guide track, a fixed wire gripping jaw on said carriage, a movable wire gripping jaw, a rocker-plate for applying wire gripping pressure to said movable jaw, an eccentric for actuating said rocker-plate, a lever and link mechanism for rotating said eccentric and at the same time producing a forward wire feeding stroke of said carriage, and timed means to sever shank-forming portions from said wire operative on completion of the feeding stroke of said carriage, and means to vary the effective operation of the gripping means of said carriage to thereby vary the length of wire fed during and by the feeding stroke of said carriage according to the length of handle shank-forming portions desired.

6. In a dauber making machine having means to apply handle shank wire to filamentary material, means to automatically feed wire from a continuous supply and cut the same into handle shank-forming portions for attachment to said filamentary material, comprising a guide track, a carriage reciprocable on said guide track, a fixed wire gripping jaw on said carriage, a movable wire gripping jaw, a rocker-plate for applying wire gripping pressure to said movable jaw, an eccentric for actuating said rocker-plate, a lever and link mechanism for rotating said eccentric and at the same time producing a forward wire feeding stroke of said carriage, and timed means to sever shank-forming portions from said wire operative on completion of the feeding stroke of said carriage, and means to vary the effective operation of the gripping means of said carriage to thereby vary the length of wire fed during and by the feeding stroke of said carriage according to the length of handle shank-forming portions desired, said latter means comprising a spring thrust slide rod having a detent arm, adjustable stop means to vary the spring thrust stroke of said slide-rod, and means engageable by said detent to produce a coincidental movement of said slide rod and carriage whereby said wire gripping means is held inactive during a desired portion of the feeding stroke of the latter.

In testimony, that I claim the invention set forth above I have hereunto set my hand this 23rd day of February, 1928.

LEWIS MIR.